United States Patent
Clark

(10) Patent No.: US 7,990,014 B2
(45) Date of Patent: Aug. 2, 2011

(54) STATORS FOR ELECTRICAL MACHINES

(75) Inventor: Paul Eaton Clark, Warwickshire (GB)

(73) Assignee: Converteam UK Ltd., Warwickshire (GB)

( * ) Notice: Subject to any disclaimer, the term of this patent is extended or adjusted under 35 U.S.C. 154(b) by 82 days.

(21) Appl. No.: 12/442,431

(22) PCT Filed: Sep. 24, 2007

(86) PCT No.: PCT/GB2007/003569
§ 371 (c)(1),
(2), (4) Date: Jul. 29, 2009

(87) PCT Pub. No.: WO2008/040937
PCT Pub. Date: Apr. 10, 2008

(65) Prior Publication Data
US 2010/0013347 A1   Jan. 21, 2010

(30) Foreign Application Priority Data

Oct. 4, 2006   (GB) .................................. 0619538.2

(51) Int. Cl.
    H02K 1/16   (2006.01)
(52) U.S. Cl. ............................................... 310/216.069
(58) Field of Classification Search ........... 310/216.019, 310/216.069, 216.071–216.073, 216.094–216.099, 310/216.101, 187, 254.1, 208
See application file for complete search history.

(56) References Cited

FOREIGN PATENT DOCUMENTS

| DE | 2163693 | 6/1973 |
|----|---------|--------|
| DE | 10112268 | 10/2002 |
| GB | 981961 | 2/1965 |
| JP | 57-78339 | 5/1982 |
| JP | 57-88843 | 6/1982 |

*Primary Examiner* — Quyen Leung
*Assistant Examiner* — Eric Johnson
(74) *Attorney, Agent, or Firm* — Eckert Seamans Cherin & Mellott, LLC; David C. Jenkins, Esquire

(57) ABSTRACT

An improved stator (28) for rotating electrical machines with single-layer stator windings consisting of a plurality of pre-formed coils (22) of equal angular pitch. The stator (28) has a first cylindrical surface in which a plurality of circumferentially spaced winding slots (30) are formed and in which the axially-extending winding runs (24) of the pre-formed coils (22) are positioned. The two winding runs (24) of each coil (22) will each be positioned in a winding slot (30) and the two winding slots (30) that receive the coil (22) define a winding slot pair. The improvement arises from the fact that the winding slots (30) of each winding slot pair extend into the stator (28) in substantially parallel directions. This means that the axially-extending winding runs (24) of each pre-formed coil (22) may also be substantially parallel and need not be angled towards each other. This enables the stator (28) to be easily wound as each pre-formed coil (22) may be simply and easily slotted into a parallel winding slot pair.

11 Claims, 3 Drawing Sheets

STATORS FOR ELECTRICAL MACHINES

CROSS REFERENCE TO RELATED APPLICATIONS

This application is a U.S. National Stage of PCT/GB2007/003569 which claims priority to GB Patent Application No. 0619538.2 filed Oct. 4, 2006.

FIELD OF THE INVENTION

The present invention relates to rotating electrical machine, and in particular to electrical machines that have single-layer stator windings that are formed by slotting pre-formed coils into open-type winding slots formed in a stator and provides a novel stator for such electrical machines.

BACKGROUND OF THE INVENTION

A common method of forming single-layer stator windings in large rotating electrical machines is to slot a plurality of pre-formed coils into open-type winding slots formed in a surface of the stator. The coils are formed separately from the stator and then individually dropped into position in the winding slots during the winding process. Each pre-formed coil is constructed from one or more insulated conductors as a complete loop and has several turns. The coils are usually formed from rectangular conductors but may also be formed from round conductors as long as the complete coil is substantially rectangular in cross-section. A typical individual pre-formed coil is shown in FIG. 1. The pre-formed coil 2 has two axially-extending winding runs 4 that are each received within an open-type winding slot formed in the stator of the electrical machine. The pre-formed coil 2 has an endwinding 6 at each end that protrudes out from the axial end of the stator when the coil is positioned within the winding slots. The axially-extending winding runs 4 and endwinding 6 of the pre-formed coil are both substantially rectangular in cross-section in order that the coil may be received in the winding slots and function properly.

In electrical machines with single-layer windings each winding slot in the stator contains only one winding run 4 and the two winding runs of each pre-formed coil are spaced so as to be received in winding slots that are separated by a number of intermediate winding slots. For example, pre-formed coils for a three-phase single-layer winding with one-slot-per-pole-per-phase have a pitch of three winding slot pitches. This means that the two axially-extending winding runs of each coil are received in winding slots that have two intermediate winding slots between them.

Conventional rotating electrical machines use stator windings with a plurality of pre-formed coils, as described above. The stator will include a number of identical winding slots that extend radially into the laminated stator core and are uniformly spaced around the circumference of the stator. The winding slots will often be "open-type" that are substantially parallel-sided along their length and depth in order that the pre-formed coils can be inserted into them in a radial direction. The winding slots will normally be formed parallel to the longitudinal axis of the stator, but in some electrical machines they may be formed at an angle to the longitudinal axis of the stator so that the magneto-motive force (mmf) harmonics can be reduced.

Winding slots that extend into the stator along a radius of the stator are generally preferred because they are simple to form and provide suitable stator teeth characteristics. For the purposes of the following description such slots are referred to as "radial slots". The stators of most large rotating electrical machines are usually formed from a plurality of axially stacked laminations in which the winding slots are formed in each individual lamination by punching. In many cases this is done one slot at a time by an indexing punching machine and this process is greatly facilitated if the slots are radial slots. If two-layer stator windings are used then it is necessary to have radial winding slots in order to allow all the pre-formed coils to be substantially identical in shape. Radial slots also maximise the circumferential width of the stator teeth formed between the winding slots at all points along the radial length of the teeth. As a consequence, the generation of undesirable flux densities in the stator teeth during operation of the machine and the mmf needed to establish that flux density are both minimised. Furthermore, having radial slots and thereby maximising the circumferential width of the teeth also maximises the structural strength and rigidity of the stator teeth that are formed between each pair of adjacent winding slots and ensures that they can withstand the stresses they are subjected to during the winding process and during operation of the electrical machine.

However, in order to insert the pre-formed coils into radial slots it is necessary that the two winding runs of each coil are formed to be in the same orientation as the radial slots. In other words, the axially-extending winding runs of each pre-formed coil must be formed such that, when they are received in the winding slots, they are parallel to one another in the axial direction of the stator and each lies along a different radius of the stator. This means that the winding runs of each pre-formed coil will be angled relative to one another. More specifically, in a conventional rotating electrical machine the two axially-extending winding runs of each coil must be formed at an angle relative to one another that is equal to the circumferential angular separation between the central planes of the winding slots into which the winding runs are to be received. The central plane of an open-type winding slot is defined here as the plane that is equidistant from, and parallel to, the sides of the winding slot. The central plane of a radial slot will define the angular centre of that slot about the circumference of the stator.

Rotating electrical machines are typically formed such that the stator is situated radially outside of the rotor such that the winding slots are formed in the radially inner surface of the stator. However, it is also possible to form rotating electrical machines with the rotor formed radially outside of the stator such that the winding slots are formed in the radially outer surface of the stator. The axially-extending winding runs of each pre-formed coil must be angled towards each other or away from each other as required in order to be properly received in the winding slots of the corresponding winding slot pair.

FIG. 2 shows a section of a stator 8 for a large conventional rotating electrical machine. The complete stator 8 contains 240 open-type radial slots 10 that are uniformly spaced around the circumference of the radially inner surface of the stator. A single-layer pre-formed coil 2 of one slot-per-pole-per-phase construction is received in the winding slots 10a and 10d that together define a winding slot pair. The angular separation between the central planes of each pair of adjacent winding slots 10 is 1.5° (i.e. 360°/240). Each slot 10 extends substantially parallel to the longitudinal axis of the stator 8 and extends into the radially inner surface of the stator along a radius of the stator. As the slots 10 are open-type slots they are substantially parallel-sided, thus enabling a winding run of each pre-formed coil to be inserted into each slot along a radius of the stator. The pre-formed coil 2 has a pitch of three slots and the winding slots 10a and 10d that receive the winding runs 4 are therefore separated by two intermediate winding slots 10b and 10c. The angular separation between the central planes of the winding slots 10a and 10d is 4.5°. Therefore, as each winding slot 10 extends along a radius of the stator, the axially-extending winding runs 4 of the pre-formed coil 2 are also angled relative to each other by 4.5°.

Stator teeth 14 are formed between each pair of adjacent winding slots 10. As a result of the orientation of the winding slots 10, the stator teeth 14 are all oriented along a radius of the stator and are substantially identical. Furthermore, as the winding slots 10 are of uniform width, the stator teeth 14 are slightly wider at their base than at the radially inner surface of the stator 8. Stator teeth 14 formed in this manner are suitably strong and have minimal undesirable flux densities generated within them during operation of the electrical machine.

A stator that receives a single-layer stator winding will normally be wound by individually inserting the pre-formed coils into the winding slots. However, the need for the axially-extending winding runs of each pre-formed coil to be formed at an angle relative to one another so that each winding run extends along a radius of the stator can make it difficult to insert the coils into the radial slots. This means that the winding process is often time-consuming and may require a high degree of skill in order to prevent the pre-formed coils being damaged. These problems are particularly acute in large electrical machines with a high number of poles as the pre-formed coils for such electrical machines are also large and their endwindings are inherently stiff. Accordingly, there is a need for an improved stator with winding slots that makes the insertion of pre-formed coils during winding much easier. There is a particular need for such a stator that is suitable for large multi-phase rotating electrical machines with high numbers of poles. However, it is important that any such stator generates acceptable limits of undesirable flux densities during operation of the electrical machine and has stator teeth formed between its winding slots that are sufficiently strong.

SUMMARY OF THE INVENTION

The present invention provides a stator for a rotating electrical machine having a single-layer ac stator winding that includes n pre-formed coils, the stator having a first cylindrical surface with 2n circumferentially spaced open-type winding slots formed in it, each winding slot extending along an axial length of the first cylindrical surface and having a central plane, wherein the 2n winding slots define n winding slot pairs, each pair having two winding slots for receiving one of the coils and whose central planes are circumferentially spaced at the first cylindrical surface of the stator by an angular distance that is equal to the angular pitch of the coil received in the winding slot pair, CHARACTERISED IN THAT the central planes of the two winding slots forming each winding slot pair are substantially parallel to one another and at least one of those central planes does not extend along a radius of the stator.

As used herein, the "central plane" of each open-type winding slot is defined as the plane that is substantially equidistant from, and substantially parallel to, the sides of each winding slot. Winding slots which have their central planes oriented along a radius of a stator are described as "radial slots". In the following description, the winding slots of a stator are numbered in a clockwise direction around the stator, relative to a first axial end of the stator. The progression from a first winding slot of a winding slot pair to the second winding slot of the slot winding pair will therefore always be in the clockwise direction relative to the first axial end of the stator. Finally, the term "axial line" is defined as any line that is parallel to the central rotational axis of the stator.

A stator according to the present invention may be wound in the conventional manner by individually inserting a suitable pre-formed coil into each winding slot pair such that each axially-extending winding run of the coil is substantially contained within one of the winding slots of the winding slot pair. When the stator has been completely wound, each winding slot will contain one winding run. The winding runs of each pre-formed coil will be contained in a winding slot pair and the winding runs will extend into the stator in substantially parallel directions.

It will be readily appreciated that the pre-formed coils for the stator must also have axially-extending winding runs that are substantially parallel to one another both in the axial direction of the stator and in a perpendicular direction. In other words, the winding runs do need not be angled relative to one another in order to be received in the radial slots of a conventional stator but can be made substantially parallel. Winding a stator according to the present invention may be achieved by simply and easily inserting the parallel winding runs of each pre-formed coil into the parallel winding slots of each winding slot pair. The present invention therefore provides a significant reduction in winding time and damage to the pre-formed coils is much less likely during the winding process. The stator according to the present invention is of particular benefit in large electrical machines with high numbers of poles as the pre-formed coils for such machines are inherently stiff.

The parallel winding slots of each winding slot pair can be considered to be formed by rotating a first winding slot and a second winding slot away from the orientation they would adopt in a conventional stator. For example, a winding slot pair of a conventional stator may have a first radial slot and a second radial slot formed in its inner cylindrical surface and the central planes of those slots may be angularly separated around the circumference of the inner cylindrical surface of the stator by 4.5°. In order to form a parallel winding slot pair the orientation of the first and second radial slots can be adjusted. The first and second radial slots could be made parallel by rotating the first slot clockwise and the second slot anti-clockwise from the conventional radial orientation by 2.25° about the line of intersection between their central planes and the inner cylindrical surface of the stator. This would result in a parallel winding slot pair and would maintain the 4.5° circumferential separation of the central planes of the slots at the inner cylindrical surface of the stator. A complete stator according to the present invention could be formed by extending the above concept to all of the winding slot pairs of a conventional stator by altering the orientation of the radial slots.

In the above example both the first radial slot and the second radial slot are rotated by the same amount but it is to be appreciated that parallel winding slot pairs may also be formed by rotating the first radial slot and the second radial slot by different amounts. For example, instead of rotating the first and second radial slots by 2.25°, the first radial slot could stay aligned with the radius of the stator and the second radial slot could be rotated anti-clockwise by 4.5°. Alternatively, the first radial slot could be rotated clockwise by 3° and the second radial slot could be rotated anti-clockwise by 1.5°. For this particular example, the first and second radial slots can each be rotated by any amount (subject to the design considerations discussed below) as long as the sum of the angles through which the two slots are rotated is equal to 4.5°.

It is also possible that either or both of the radial slots could be rotated about axial lines other than the lines of intersection between their central planes and the first cylindrical surface of the stator. For example, one or both of the radial slots could be rotated about their leading edge at the first cylindrical surface of the stator or they could be rotated about axial lines on their central planes that lie within the stator. The radial slots could even be rotated about lines that are axially parallel to the slots but are located at a distance from them. However, rotation about lines away from the rotated slots will affect the depth of the rotated slots and in such cases it is necessary to ensure that each rotated slot is not too deep or that it retains enough depth to satisfactorily contain a suitable pre-formed winding coil.

In general terms, to adjust the design of a conventional stator with radial slots to form parallel winding slot pairs, the sum of the angle through which the first radial slot is rotated clockwise and the angle through which the second radial slot is rotated anti-clockwise is equal to the angular separation between the points about which each radial slot is rotated.

The same requirements for creating parallel winding slot pairs can also be applied to winding slots formed in an outer circumferential surface of the stator (i.e. for a rotating electrical machine where the rotor is radially outside of the stator).

When designing a stator according to the present invention the preferred relative degree of rotation of the first and second slot of each winding slot pair away from their conventional radial orientations and the preferred axial line about which they are each rotated will be dependent upon a number of design factors. These factors include the mechanical strength of the stator teeth formed between each pair of adjacent winding slots, the flux density within the stator teeth, the construction method of the stator and the number of winding slots formed in the stator. Such factors will be readily appreciated by the skilled person but are discussed in more detail below.

The effects of the parallel winding slot pairs on the stator teeth formed between the winding slots are particularly important. As explained above, in a conventional stator each stator tooth will be identical and formed between two substantially parallel-sided radial slots. When radial slots are formed in the inner circumferential surface of a stator the stator teeth are substantially radial and are wider at their root than at the surface of the stator. The width of each stator tooth is defined by the circumferential width and angular separation of the winding slots, which is dependent upon the number of winding slots formed around the stator. However, the stator teeth in stators according to the present invention will be distorted from this conventional shape and orientation due to the presence of non-radial winding slots. The shape of each stator tooth in a stator according to the present invention will depend not only upon the dimensions and separation of the adjacent winding slots but also upon the orientation of those winding slots. Furthermore, as the orientation of different winding slots around any individual stator may be rotated from the orientation of the equivalent conventional radial slots by different amounts in different directions and about different axial lines the stator teeth formed around a stator according to the present invention may not all be identical.

The size, shape and orientation of the stator teeth are important to the operation of the electrical machine. For example, it is necessary that all of the stator teeth have enough mechanical strength to withstand any mechanical forces they may be subjected to during winding of the stator and the torque producing forces they are subjected to during operation of the electrical machine. The vibration characteristics of the stator teeth are another important factor. It is important that none of the stator teeth resonate with the electromagnetic forces produced during operation of the electrical machine. This is because such resonance can produce an unacceptable noise level, reduce the efficiency of the electrical machine and, in extreme cases, even cause complete failure. In order to avoid resonance with the electrical machine the stator teeth may be designed to be 'weak' or 'strong' relative to the resonant frequencies of the machine. The vibration characteristics of any individual stator tooth are defined by its size and shape in a manner that would be known to the skilled person.

The generation of unacceptable magnetic flux densities in the stator teeth during operation of an electrical machine is also influenced by the size, shape and orientation of the teeth. Therefore it is important that the stator of the present invention is designed such that the maximum flux density generated in the stator teeth is within acceptable limits. The effect of the size and shape of the stator teeth on the generation of magnetic flux densities can be predicted using any suitable modelling technique, for example.

The angular spacing of the slots at the first cylindrical surface of the stator is another important design factor. In a conventional stator the winding slots are uniformly spaced around the cylindrical surface of the stator and the angular pitch of the winding slots is therefore also uniform. It is possible to maintain that spacing in the stator of the present invention. However, it is also possible to form stators of the present invention which have winding slots that are not uniformly spaced about the first cylindrical surface of the stator. For example, if each winding slot is formed in a position that is rotated away from the orientation of the equivalent conventional radial slot about an axial line that is part-way down the central plane of the winding slot then the winding slots will be unevenly spaced about the first cylindrical surface of the stator. This may have an affect on the mmf space harmonics in the airgap between the stator and the rotor during operation of the electrical machine. The effects of any given spacing pattern should therefore be considered when designing the stator. The effects may be predicted using any suitable modelling technique, for example.

Another important design consideration is the method of construction of the stator core itself. Stator cores are conventionally constructed from laminations of rolled steel that are layered one on top of another in the axial direction of the stator. Successive laminations are usually rotated relative to one another in order to facilitate the core construction. This is because the laminations are not generally of uniform thickness as the rolled steel is thinner at the edges than at the middle. Typically small and medium sized stator cores are formed from successive ring laminations that are each rotated by 90° relative to the adjacent laminations. Large stators, and in particular those with core diameters greater than about 1250 mm, are generally formed from segmental laminations. The segments of each successive lamination are typically positioned to overlap the segments of the axially adjacent laminations by 50% or 33⅓% depending upon the specific design of the stator core. The orientation of the winding slots in a stator according to the present invention is preferably compatible with the relative angular displacement of the laminations used to form the core. This will normally require some degree of rotational symmetry of the winding slots about the rotational axis of the electrical machine.

A stator according to the present invention will only be practical if the above design considerations are adequately fulfilled. Consequently the present invention may not be well suited for all electrical machines. For example, the present invention may not be well suited for electrical machines where any two adjacent winding slots are required to be oriented such that they would impinge upon one another, thereby making the formation of a strong stator tooth between those winding slots impossible. This would be most likely to happen in small stators with low numbers of poles or in machines which require particularly wide winding slots.

The present invention is, however, particularly well suited to large electrical machines that have high numbers of poles. This is because the number of winding slots formed in the stator in an electrical machine is generally proportional to the number of poles and the mean angular separation between adjacent winding slots at the first cylindrical surface of the stator is inversely proportional to the number of slots and therefore the number of poles. This means that the more poles that an electrical machine has, the more winding slots it will have and the angular separation between those slots will be lower. This is particularly important because the amount by which each winding slot of each winding slot pair needs to be rotated from the orientation of the equivalent conventional radial slot in order for the two slots to be parallel is directly dependent upon the angular separation of the two slots. The lower the angular separation of the two winding slots the less they will need to be rotated and the easier it will be to fulfil the necessary design criteria. For example, stator teeth are much more likely to be strong and have acceptable vibration characteristics if the winding slots either side of each stator tooth are formed at only a relatively small angle to the orientation of the equivalent conventional radial slots than if the winding slots are formed at larger angles.

Stators of the present invention are preferably formed such that every winding slot around the stator is oriented at the same angle to the orientation of the equivalent conventional radial slot and that each winding slot is rotated from that orientation about an axial line that lies along the central plane of the winding slot and is at the same radial distance from the longitudinal axis of the stator. That is, it is generally preferred that each winding slot is rotated about an axial line which lies along a cylindrical surface which is coaxial with the stator. For example, the cylindrical surface may be the first cylindrical surface of the stator or it may be a second cylindrical surface that is not an inner or outer cylindrical surface of the stator but is actually defined within the body of the stator itself. A conventional radial slot would form an acute angle of intersection with the cylindrical surface along which the axial lines of rotation lie. If each winding slot is oriented at the same angle to the orientation of the equivalent conventional radial slot then the acute angle of intersection formed between each slot and the relevant cylindrical surface will be equal.

For example, in a stator with 240 winding slots and a three-phase single-layer stator winding it is generally preferred that each winding slot is formed at an angle of 2.25° to the orientation of the equivalent conventional radial slot and that each winding slot is rotated away from that orientation about the line of intersection between its central plane and the first cylindrical surface of the stator. This arrangement of winding slots is preferred because it enables the rotational symmetry of the winding slots about the stator to be maximised. Increased rotational symmetry is a benefit as it can minimise the magnitude of undesirable flux densities generated in the stator teeth and it enables the performance of the stator to be better predicted. Furthermore, as explained above, a high degree of rotational symmetry is sometimes necessary in order to enable the construction of stators formed from axially stacked laminations, particularly if the stator is large. Finally, at least some of the stator teeth that are formed in a stator with slots oriented in the above manner may be aligned along a radius of the stator and depending on the particular slot width, stator winding and the axial line of rotation of each of the winding slots this may lead to suitably strong teeth with acceptable vibration characteristics.

The preferred axial line about which each slot is rotated will vary depending upon the precise design of each electrical machine. In some machines it will be preferable that each winding slot is rotated away from the orientation of the equivalent conventional radial slots about the line of intersection between the central plane of each slot and the first cylindrical surface of the stator because this enables the slots to be uniformly spaced at the first cylindrical surface of the stator and the mmf space harmonics of the electrical machine will be substantially unaffected by the rotation of the slots. In other words, the mmf space harmonics will be similar to those for a conventional stator having radial slots.

In other electrical machines it may be preferable that each winding slot is rotated away from the orientation of the equivalent conventional radial slots about an axial line that lies along the central plane of each slot. For example, each winding slot may be rotated about an axial line along the central plane and about half-way down the depth of each slot even though this will result in non-uniform winding slot spacing at the first cylindrical surface of the stator. Winding slots oriented in this manner may be preferred as they may enable the volume of all the stator teeth to be substantially equal. This will often enable the stator teeth to have suitable strength and vibration characteristics and may also assist the control of undesirable flux generation in the teeth. It is also worth noting that the non-uniform spacing of the winding slots at the first cylindrical surface of the stator is not necessarily detrimental to the operation of the electrical machine. In some cases the altered mmf space harmonics that are produced may actually be preferable to those produced in conventional stators.

Although stators according to the present invention may be used in any electrical machine with a single-layer stator winding they are particularly suited to machines having very low numbers of winding slots-per-poles-per-phase, and in particular one slot-per-pole-per-phase. This is because it is possible to form stators according to the present invention that are suitable for receiving multi-phase (typically, but not exclusively, three-phase) single-layer stator windings that have stator teeth that are each symmetrical about a radius of the stator. More specifically, this is possible if all the winding slots are oriented at the same angle relative to the orientation of the equivalent conventional radial slot and are rotated away from that orientation about axial lines at the same distance from the axis of the stator. These embodiments of the present invention are particularly preferred as stator teeth that are symmetric about a radius of the stator may be relatively strong and tend to have acceptable vibration characteristics, depending upon the specific design of the electrical machine.

It will be appreciated that the preferred arrangement of the stator for any particular rotating electrical machine and its resulting properties will not solely depend on the factors discussed above. Other factors may include the required width and depth of the winding slots and desired power and operating speed of the rotating electrical machine, for example.

BRIEF DESCRIPTION OF THE DRAWINGS

The features and advantages of the present invention will become more apparent from the following detailed description of a preferred embodiment of the invention when taken in conjunction with the accompanying drawings, in which.

DETAILED DESCRIPTION OF THE PREFERRED EMBODIMENTS

Figure 1:
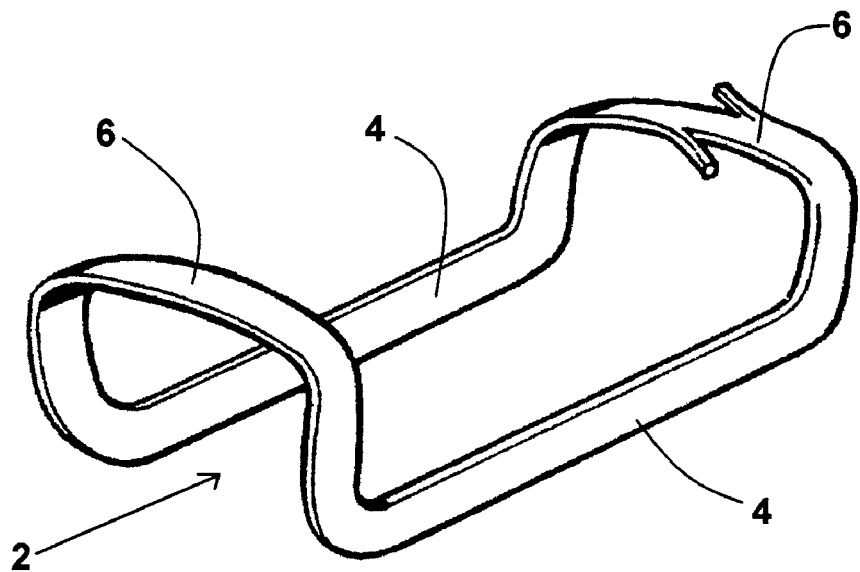
FIG. 1 shows an individual single-layer pre-formed coil according to the prior art.
Figure 2:
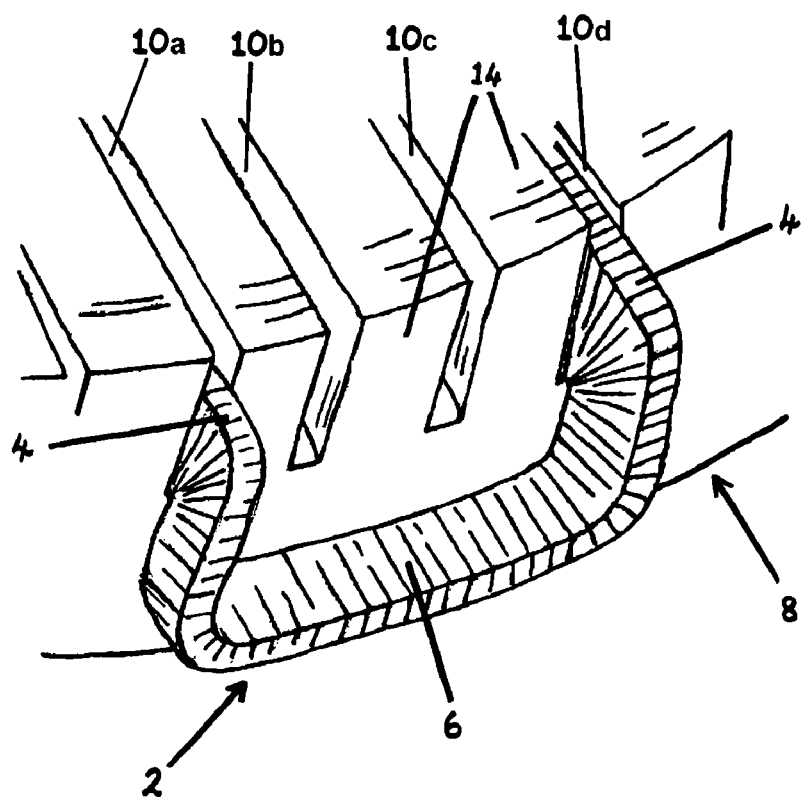
FIG. 2 is a schematic view of a portion of a stator and a single pre-formed coil according to the prior art.
Figure 3:
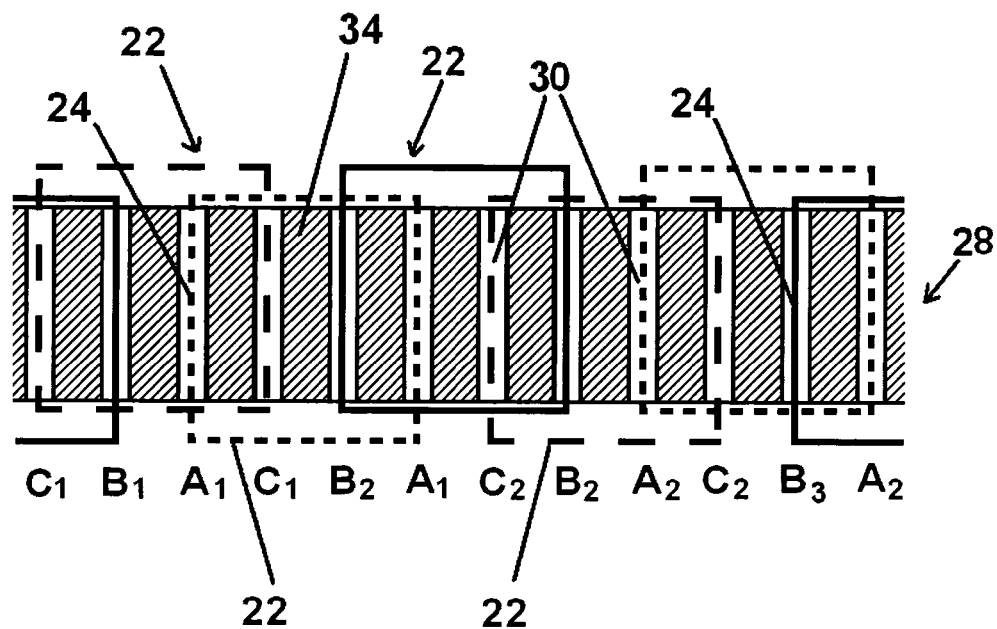
FIG. 3 is a schematic view of a section of a stator according to the present invention with one-slot-per-pole-per-phase and having a three-phase two-tier single-layer stator winding.

FIG. 3 shows a stator that has a three-phase two-tier single-layer stator winding with one slot-per-pole-per-phase. The stator 28 is shown in a highly schematic manner in order to show the stator winding and it will be readily appreciated that the illustrated dimensions of the stator 28 do not correspond to the actual dimensions. FIG. 3 is oriented such that the radii of the stator 28 extend into the paper, the longitudinal axis of the stator 28 is parallel to the vertical direction of the paper and the circumference of the stator 28 is parallel to the horizontal direction of the paper. The section of the stator 28 that is shown in FIG. 3 includes twelve winding slots 30 and each slot contains the axially-extending winding run 24 of a pre-formed coil 22. Each coil 22 has a pitch of three winding slots 30 and the two winding runs 24 of each coil 22 are therefore contained in winding slots 30 that are separated by two intermediate winding slots. As the stator 28 contains a three-phase stator winding it contains phase A coils, phase B coils and phase C coils. Phase A coils are indicated by dotted lines, phase B coils are indicated by bold lines and phase C coils are indicated by dashed lines. However, it will be understood that the different phase coils 22 are all formed in the same manner and are substantially identical; the phase coils are only illustrated in this manner so that the different phases can be clearly identified. The winding slots 30 have also been numbered to indicate which coil 22 they contain. For example, the winding slots 30 numbered B2 each contain an axially-extending winding run 24 of the second phase B coil where the coils 22 are counted from left to right (i.e. in a clockwise direction). It will be noted that the two B2 winding slots 30 are separated from one another by intermediate A1 and C2 winding slots 30. The overlap of the coils 22 at each axial end of the stator 28 is accommodated in two tiers as shown. For example, the coil 22 contained in the B2 winding slots overlaps the coils 22 contained in the A1 and C2 winding slots 30 outside the stator 28 such that the overlapping coils 22 form two-tiers at each axial of the stator 28. The coil 22 contained in the B2 winding coil forms the innermost of the two tiers at a first axial end of the stator 28 (i.e. above the stator as shown in FIG. 3) and the outermost of the two tiers at a second axial end of the stator 28 (i.e. below the stator as shown in FIG. 3).

A conventional winding slot (i.e. a radial slot) would be oriented with its central plane along a radius of the stator. The three-phase two-tier single-layer stator winding with one slot-per-pole-per-phase as shown in FIG. 3 enables each pair of adjacent winding slots 30 to be rotated away from the orientation of equivalent conventional radial slots in opposite directions. This means that each of the stator teeth 34 formed between the winding slots 30 may be substantially symmetrical about a radius of the stator 28. Such an arrangement is preferred because it can minimise the generation of undesirable flux densities and may provide strong stator teeth 34 with suitable vibration characteristics.

Figure 4:
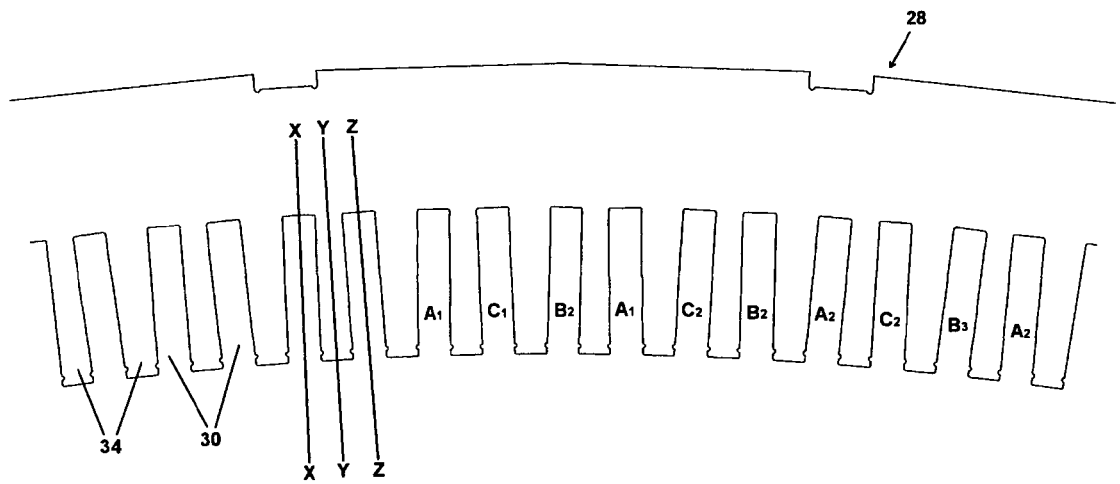
FIG. 4 is a schematic view of a section of a preferred embodiment of a stator according to the present invention.
Figure 5:
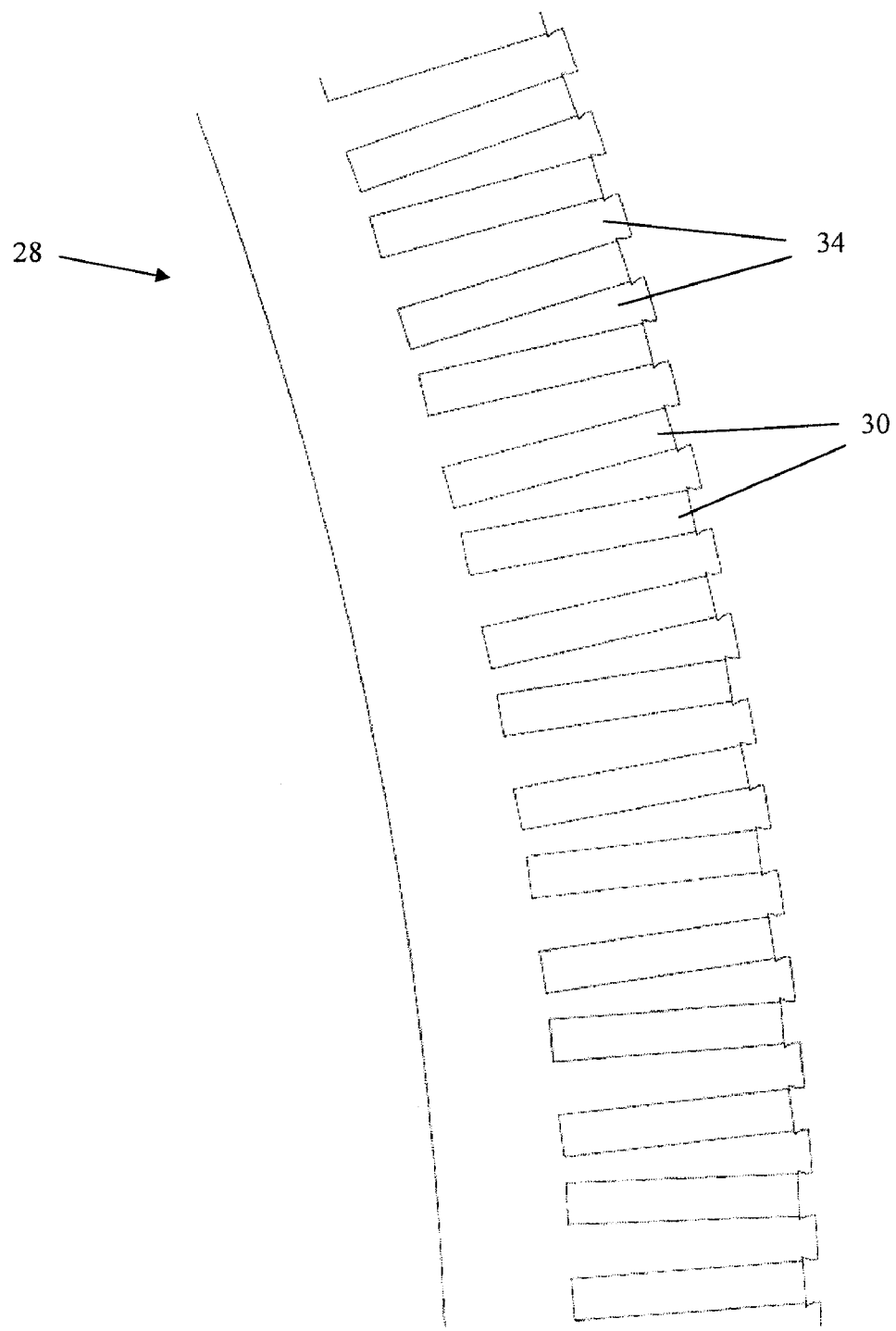
FIG. 5 is a schematic view of a section of an alternate embodiment of a stator according to the present invention.

FIG. 4 is a schematic view of a section of the axial end of a stator 28 according to a preferred embodiment of the present invention. The winding slots 30 are open-type slots with substantially parallel sides. Stator teeth 34 are formed between each pair of adjacent winding slots 30. Only a part of the stator 28 is shown in FIG. 4 but the complete stator contains 240 winding slots. The winding slots 30 are formed in such a manner that they are uniformly spaced about the radially inner surface of the stator 28 and the angular separation of the central planes of each pair of adjacent winding slots 30 at the radially inner surface of the stator is therefore 1.5° (360°/240). The stator 28 is suitable for a three-phase two-tier single-layer stator winding as indicated by the winding coil numbers A1, C1, B2, A1 etc. shown in some of the winding slots, which are numbered in the same manner as the winding slots 30 in FIG. 3.

The central plane of each winding slot 30 is angled away from a radius of the stator 28 by the same amount. In order that the two winding slots 30 that comprise each winding slot pair are substantially parallel with one another, each winding slot 30 is angled away from a radius of the stator 28 and towards the other winding slot 30 of the slot pair by 2.25°. In order to maintain uniform spacing of the winding slots 30 around the radially inner surface of the stator 28, the winding slots are all formed in orientations that are rotated away from a radius of the stator about the lines of intersection of their central planes and the radially inner surface of the stator. For example, the central planes of the two winding slots 30 that form the B2 winding slot pair (and which therefore receive the axially-extending winding runs of the second phase B coil) have a circumferential angular separation of 4.5° at the radially inner surface of the stator 28. Each winding slot 30 in the B2 winding slot pair is angled away from a radius of the stator 28 and towards the other winding slot by 2.25°. More particularly, the central plane of the left-most winding slot of the B2 winding slot pair is rotated away from a radius of the stator 28 in the clockwise direction by 2.25° and the central plane of the right-most slot of the B2 winding slot pair is rotated from a radius of the stator in the anti-clockwise direction by 2.25°. The central planes of the two slots of the B2 winding slot pair are therefore formed substantially parallel to one another. In the same way the two winding slots that together define any particular winding slot pair are formed such that their central planes substantially parallel to one another. This is in direct contrast to conventional stators having radial slots where the central planes of the two winding slots of any particular winding slot pair are angled with respect to each other.

In order to show more clearly the angling of the winding slots 30 relative to the radii of the stator 28, the central planes of two adjacent winding slots 30 are indicated by the lines XX and ZZ. The line YY is parallel to a radius of the stator 28 and represents the central plane of the stator tooth 34 formed between the two adjacent winding slots 30. In a conventional stator the lines XX and ZZ would both be parallel to radii of the stator and would therefore be at an angle of 0.75° to the line YY. All three lines XX, YY and ZZ would also coincide at the central axis of the stator 8. However, in the stator according to the present invention shown in FIG. 4, both the winding slots 30 are angled away from a radius of the stator 28 and towards each other by 2.25°. Therefore the angle formed between line XX and line YY is 1.5° and the angle formed between line YY and line ZZ is 1.5°. The lines XX, YY and ZZ now coincide at a point radially outside the stator 28. Only line YY extends along a radius of the stator and thus passes through the central axis of the stator 28. In this manner parallel winding slot pairs are formed. For example, the winding slot 30 whose central plane is indicated by the line XX is a C1 winding slot and is substantially parallel to the other C1 winding slot shown in FIG. 4 to form a C1 winding slot pair.

The stator teeth 34 formed between each pair of adjacent winding slots 30 are substantially symmetrical about a radius of the stator 28. The width of each of the stator teeth 34 is defined by the width of the winding slots 30 either side of each tooth 34 and the pitch of the winding slots at the surface of the stator. The winding slots 30 must be wide enough to accommodate the axially-extending winding runs of the coils 22 but must also be narrow enough to hold the winding runs securely and to ensure that the intermediate stator teeth 34 are sufficiently strong to withstand the stresses they are put under during operation of the electrical machine. Because of the rotation of adjacent winding slots 30 in opposite directions, two different sized and shaped stator teeth 34 are formed alternately around the stator 28. Where the two winding slots 30 adjacent to a stator tooth 34 are both rotated away from the stator tooth then it will be wider at its root than at its radially inner edge and will have a greater volume than a tooth in an equivalent conventional stator with radial slots. However, where the two winding slots 30 adjacent to a stator tooth 34 are both rotated towards the stator tooth then it will be narrower at its root than at its radially inner edge and will have less volume than the a tooth formed in an equivalent conventional stator. It is important that both types of teeth 34 are sufficiently strong and have suitable vibration characteristics, as discussed above.

The stator 28 shown in FIG. 4 has 120-fold rotational symmetry, which is half that of an equivalent conventional stator. As this is only a relatively small reduction in rotational symmetry, it can be readily accommodated in the design of lamination segments in order to enable stators according to the present invention to be constructed from segmental laminations in a conventional manner. Furthermore, the minimal reduction in rotational symmetry may help to minimise any increase in undesirable flux density in the stator teeth 34 due to the non-radial winding slots 30.

The invention claimed is:

1. A rotating electrical machine comprising:
   a multi-phase single-layer stator winding that includes n pre-formed coils, wherein each pre-formed coil includes a pair of winding runs that are substantially parallel to each other in both the axial direction of the stator and the direction in which they extend into the stator; and
   a stator having a first cylindrical surface with 2n circumferentially spaced open-type winding slots formed in it, each winding slot extending along an axial length of the first cylindrical surface and having a central plane, wherein the 2n winding slots define n winding slot pairs, each pair having two winding slots for receiving one of the coils that are separated by one or more intermediate slots and whose central planes are circumferentially spaced at the first cylindrical surface of the stator by an angular distance that is equal to the angular pitch of the coil received in the winding slot pair, wherein the central planes of the two winding slots forming each winding slot pair are substantially parallel to one another and at least one of those central planes does not extend along a radius of the stator.

2. A rotating electrical machine according to claim 1, wherein the first cylindrical surface is the radially inner surface of the stator.

3. A rotating electrical machine according to claim 1, wherein the first cylindrical surface is the radially outer surface of the stator.

4. A rotating electrical machine according to claim 1, wherein the central planes of the winding slots are uniformly angularly spaced about the first cylindrical surface of the stator.

5. A rotating electrical machine according to claim 1, further including a second cylindrical surface that is coaxial with the first cylindrical surface of the stator and is defined within the body of the stator such that the central plane of each winding slot intersects the second cylindrical surface along a line of intersection and the lines of intersection are uniformly spaced about the circumference of the second cylindrical surface.

6. A rotating electrical machine according to claim 1, wherein the stator has n-fold rotational symmetry.

7. A rotating electrical machine according to claim 1, wherein the first cylindrical surface has a diameter greater than 1250 mm.

8. A rotating electrical machine according to claim 1, wherein n =120.

9. A rotating electrical machine according to claim 1, wherein the stator has one-slot-per-pole-per-phase.

10. A rotating electrical machine according to claim 1, wherein the stator winding is a two-tier single-layer stator winding.

11. A rotating electrical machine according to claim 1, wherein the stator winding is a three-phase two-tier single-layer stator winding.

* * * * *

UNITED STATES PATENT AND TRADEMARK OFFICE
CERTIFICATE OF CORRECTION

| | | |
|---|---|---|
| PATENT NO. | : 7,990,014 B2 | |
| APPLICATION NO. | : 12/442431 | |
| DATED | : August 2, 2011 | |
| INVENTOR(S) | : Paul Eaton Clark | |

It is certified that error appears in the above-identified patent and that said Letters Patent is hereby corrected as shown below:

Column 2, line 23, "slots it is" should read --slots, it is--.
Column 4, line 52, "example both" should read --example, both--.
Column 5, line 23, "invention" should read --invention,--.
Column 5, line 40, "stator the" should read --stator, the--.
Column 5, line 56, "lines the" should read --lines, the--.
Column 6, line 4, "machine the" should read --machine, the--.
Column 6, line 31, "slot then" should read --slot, then--.
Column 6, line 63, "Consequently the" should read --Consequently, the--.
Column 7, line 24, "winding slots either" should read --winding slots on either--.
Column 8, line 36, "ing they" should read --ing, they--.
Column 8, line 49, "symmetric" should read --symmetrical--.
Column 9, line 5, "winding; and" should read --winding;--.
Column 9, line 7, "invention." should read --invention; and--.
Column 9, line 30, "winding it" should read --winding, it--.
Column 10, line 43, "planes substantially" should read --planes are substantially--.
Column 11, line 6, "slots 30 either" should read --slots 30 on either--.
Column 11, line 24, "than the a tooth" should read --than a tooth--.

Signed and Sealed this
Third Day of April, 2012

David J. Kappos
*Director of the United States Patent and Trademark Office*